(12) United States Patent
Takita et al.

(10) Patent No.: US 8,107,009 B2
(45) Date of Patent: Jan. 31, 2012

(54) TELEVISION CONNECTION STATE DETECTING DEVICE AND IMAGE DISPLAY DEVICE

(75) Inventors: Kazuya Takita, Kitakyushu (JP); Seiji Takamatsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 992 days.

(21) Appl. No.: 12/077,015

(22) Filed: Mar. 14, 2008

(65) Prior Publication Data
US 2008/0225169 A1 Sep. 18, 2008

(30) Foreign Application Priority Data
Mar. 15, 2007 (JP) ................................ 2007-067416

(51) Int. Cl.
H04N 5/04 (2006.01)
H04N 5/46 (2006.01)

(52) U.S. Cl. ........................................ 348/552; 348/558

(58) Field of Classification Search ........................ None
See application file for complete search history.

(56) References Cited

U.S. PATENT DOCUMENTS

| | | | | |
|---|---|---|---|---|
| 5,727,049 A | * | 3/1998 | Sato | 379/93.17 |
| 5,754,227 A | * | 5/1998 | Fukuoka | 348/231.6 |
| 6,462,508 B1 | * | 10/2002 | Wang et al. | 320/107 |
| 7,414,606 B1 | * | 8/2008 | Wong et al. | 345/100 |

FOREIGN PATENT DOCUMENTS

| | | | | |
|---|---|---|---|---|
| JP | 03132179 A | * | 6/1991 | |
| JP | 05-073016 | | 3/1993 | |
| JP | 07-311639 | | 11/1995 | |
| JP | 10312178 A | * | 11/1998 | |
| JP | 11-136544 | | 5/1999 | |
| JP | 2000013776 A | * | 1/2000 | |
| JP | 20014-045412 | | 2/2001 | |
| JP | 2004173263 A | * | 6/2004 | |
| JP | 2006080816 A | * | 3/2006 | |
| JP | 2006317757 A | * | 11/2006 | |
| JP | 2007225980 A | * | 9/2007 | |

* cited by examiner

Primary Examiner — Brian Pendleton
Assistant Examiner — Fernando Alcon
(74) Attorney, Agent, or Firm — Nutter McClennen & Fish LLP; John J. Penny, Jr.

(57) ABSTRACT

The invention provides a television-connection-state detecting device that includes: a resistor element that outputs an analog video signal that is to be displayed on a television receiver; a reference voltage generation circuit that generates reference voltages for comparing a voltage signal level at the television-connection-terminal side end of the resistor element and a voltage signal level at the opposite-side end of the resistor element; a first clamping circuit that clamps a voltage signal level at the television-connection-terminal side end of the resistor element at the first reference voltage; a second clamping circuit that clamps a voltage signal level at the opposite-side end of the resistor element at the second reference voltage; a comparison circuit; and a judging unit that judges whether an analog video signal input device is connected to the television connection terminal or not on the basis of a voltage signal level outputted from the comparison circuit.

3 Claims, 5 Drawing Sheets

TELEVISION CONNECTION STATE DETECTING DEVICE AND IMAGE DISPLAY DEVICE

The entire disclosure of Japanese Patent Application No. 2007-067416, filed Mar. 15, 2007 is expressly incorporated by reference herein.

BACKGROUND

1. Technical Field

The present invention relates to a television-connection-state detecting device that makes detection as to whether a television set is connected to its television connection terminal or not. In addition, the invention further relates to an image display device that is provided with such a television-connection-state detecting device.

2. Related Art

Some electronic devices such as a photo-printer, a digital camera, and the like are provided with a small-sized image display unit such as a liquid crystal display or the like. Some users have a need for connecting such an electronic device to an external television (hereafter may be abbreviated as "TV") set that has a larger size of a display screen than that of the built-in image display unit thereof so as to obtain a larger picture. In such an application, from the viewpoint of user-friendliness, it is preferable that an electronic device can automatically detect the connection of an external television set; that is, it is preferable for the electronic device to be capable of making a self judgment as to whether a television set is connected to its television connection terminal or not. A television-connection-state detecting device of the related art that is described in, for example, JP-A-7-311639 performs automatic TV-connection-state detection as follows. That is, the related-art TV-connection-state detecting device described in JP-A-7-311639 compares the signal level of the TV connection terminal of an electronic device and the level of a reference voltage. Then, on the basis of the result of comparison, the related-art TV-connection-state detecting device described in JP-A-7-311639 outputs a detection signal.

However, the presence/absence of an external television set connected thereto is not directly detected in the TV-connection-state detecting technique disclosed in the above-identified patent publication because, as explained above, it merely compares the signal level of the TV connection terminal of an electronic device and the level of a reference voltage. For this reason, disadvantageously, there is a risk of erroneous detection of the presence of an external television set connected thereto even when, for example, not a TV set but a cable is connected to the TV connection terminal of an electronic device because the signal level of the TV connection terminal thereof changes due to the connection of the cable to the TV connection terminal thereof.

SUMMARY

An advantage of some aspects of the invention is to provide a television-connection-state detecting device that makes detection as to whether a television set is connected to its television connection terminal or not with improved precision. In addition, the invention further relates to an image display device that is provided with such a television-connection-state detecting device.

In order to address the above-identified problem without any limitation thereto, the invention provides, as a first aspect thereof, a television-connection-state detecting device that includes: a resistor element that is connected to a television connection terminal that outputs an analog video signal that is to be displayed on a television receiver, the resistor element having the same resistance value as that of a termination resistor of a connection terminal of the television receiver that can be connected to the television connection terminal; a reference voltage generation circuit that generates reference voltages for comparing a voltage signal level at the television-connection-terminal-side end of the resistor element and a voltage signal level at the opposite-side end of the resistor element, the reference voltage generation circuit generating each of the reference voltages in such a manner that a first reference voltage for the television-connection-terminal-side end of the resistor element is higher than a second reference voltage for the opposite-side end of the resistor element by a predetermined level difference; a first clamping circuit that clamps a voltage signal level at the television-connection-terminal-side end of the resistor element at the first reference voltage; a second clamping circuit that clamps a voltage signal level at the opposite-side end of the resistor element at the second reference voltage; a comparison circuit that has a first input terminal into which a voltage signal that has been subjected to clamping processing performed by the first clamping circuit is inputted and further has a second input terminal into which a voltage signal that has been subjected to clamping processing performed by the second clamping circuit is inputted, the comparison circuit outputting a voltage signal that has a level corresponding to high/low relationship between a voltage signal level at the first input terminal and a voltage signal level at the second input terminal that is found as a result of a comparison made therebetween; a first low-pass filter that is provided between the first input terminal of the comparison circuit and the first clamping circuit; a second low-pass filter that is provided between the second input terminal of the comparison circuit and the second clamping circuit; and a judging section that makes a judgment as to whether an analog video signal input device is connected to the television connection terminal or not on the basis of a voltage signal level outputted from the comparison circuit.

In the configuration of a television-connection-state detecting device according to the first aspect of the invention described above, a resistor element that has the same resistance value as that of the termination resistor of the connection terminal of a television receiver is connected to a television connection terminal. With such an electric configuration, in a state where a television receiver is not connected to the television connection terminal, the level of a voltage signal at the television-connection-terminal-side end of the resistor element is the same as that of the opposite-side end of the resistor element. On the other hand, upon the connection of the television receiver to the television connection terminal, the level of a voltage signal at the television-connection-terminal-side end of the resistor element decreases to one-half of that of the opposite-side end of the resistor element. The television-connection-state detecting device according to the first aspect of the invention described above detects the decrease in the level of a voltage signal as follows.

A reference voltage generation circuit generates reference voltages for comparing a voltage signal level at the television-connection-terminal-side end of the resistor element and a voltage signal level at the opposite-side end of the resistor element. The reference voltage generation circuit generates each of the reference voltages in such a manner that a first reference voltage for the television-connection-terminal-side end of the resistor element is higher than a second reference voltage for the opposite-side end of the resistor element by a predetermined level difference. A first clamping circuit clamps a voltage signal level at the television-connection-terminal-side end of the resistor element at a first reference voltage, whereas a second clamping circuit clamps a voltage signal level at the opposite-side end of the resistor element at a second reference voltage. Accordingly, a voltage signal corresponding to the television-connection-terminal-side end of the resistor element is clamped at the first reference voltage at which the level thereof is the lowest, which constitutes a first clamped signal. On the other hand, a voltage signal corresponding to the opposite-side end of the resistor element is clamped at the second reference voltage at which the level thereof is the lowest, which constitutes to a second clamped signal. Since these voltage signals are clamped at the respective reference voltages, it is possible to compare the levels thereof with each other. The first clamped signal is inputted into the first input terminal of a comparison circuit. The second clamped signal is inputted into the second input terminal of the comparison circuit.

Since the first reference voltage and the second reference voltage are generated in such a manner that the first reference voltage is higher than the second reference voltage by a predetermined level difference, in a state where a television receiver is not connected to the television connection terminal, the level of the first clamped signal is higher than that of the second clamped signal by the predetermined level difference. On the other hand, upon the connection of the television receiver to the television connection terminal, the level of a voltage signal at the television-connection-terminal-side end of the resistor element decreases to one-half of that of the opposite-side end of the resistor element. Therefore, upon the connection of the television receiver to the television connection terminal, the level of the first clamped signal becomes lower than that of the second clamped signal. As the high/low relationship of the first clamped signal and the second clamped signal, that is, a relative level state as to whether the first clamped signal is higher than the second clamped signal or not, switches over depending on the presence/absence of the television receiver connected to the television connection terminal, the level of a voltage signal that is outputted from the comparison circuit switches between a high state and a low state. Therefore, by monitoring the level state of the voltage signal outputted from the comparison circuit, it is possible to make a judgment as to whether the television receiver is connected to the television connection terminal or not. It should be noted that the above-described predetermined level difference could take any value as long as the level of the first clamped signal becomes lower than that of the second clamped signal upon the connection of the television receiver to the television connection terminal.

Since the first reference voltage and the second reference voltage are generated in such a manner that the first reference voltage is higher than the second reference voltage by the predetermined level difference, even in a state where the television receiver is connected to the television connection terminal, the level of the first clamped signal is higher than that of the second clamped signal during a time period in which each of the first clamped signal and the second clamped signal is at its minimum level, or in other words, during a time period in which the first clamped signal and the second clamped signal fall to the first reference voltage and the second reference voltage, respectively. This means that, if no measures are taken, the high/low level of a voltage signal outputted from comparison circuit switches over frequently, which is not desirable. In addition, in an NTSC color television system that is an example of a variety of television formats, an analog video signal that is outputted to the television connection terminal is configured as a superposed signal made up of a luminance signal and a high-frequency (e.g., 3.58 MHz) color-difference signal superposed thereon. Therefore, upon the connection of, for example, a connection cable that has a large capacity to the television connection terminal, the phase of the first clamped signal and the phase of the second clamped signal could be shifted from each other, which is an undesirable phenomenon. If the phase of the first clamped signal and the phase of the second clamped signal are shifted from each other so as to reverse the level relationship between the first clamped signal and the second clamped signal, erroneous detection of the presence of a television receiver connected to the television connection terminal, which is actually not, occurs.

In order to address such a technical problem, in the configuration of a television-connection-state detecting device according to the first aspect of the invention described above, a first low-pass filter is provided between the first input terminal of the comparison circuit and the first clamping circuit, whereas a second low-pass filter is provided between the second input terminal of the comparison circuit and the second clamping circuit. Because of such a filtering configuration, the high-frequency component of each of the first clamped signal and the second clamped signal that is inputted into the comparison circuit is cut out. Therefore, in a state where a television receiver is connected to the television connection terminal, the resultant first clamped signal and the second clamped signal are free from the above-described problem that is related to the level difference between the first reference voltage and the second reference voltage. Specifically, a time period during which the first clamped signal is at its minimum level ends before the first clamped signal falls to the first reference voltage. Similarly, a time period during which the second clamped signal is at its minimum level ends before the second clamped signal falls to the second reference voltage. Therefore, with such a filtering configuration, the level of the first clamped signal is never higher than that of the second clamped signal in a state where a television receiver is connected to the television connection terminal. Moreover, since the first low-pass filter and the second low-pass filter cut out the high-frequency components of the first clamped signal and the second clamped signal that are inputted into the comparison circuit, respectively, the resultant first clamped signal and second clamped signal are free from the above-described problem that is related to the phase shift of the first clamped signal and the second clamped signal with respect to each other. Therefore, it is possible to avoid the level relationship between the first clamped signal and the second clamped signal from becoming reversed undesirably. Thus, with the configuration of a television-connection-state detecting device according to the first aspect of the invention described above, it is possible to make a judgment as to whether the television receiver is connected to the television connection terminal or not with high detection accuracy.

In order to address the above-identified problem without any limitation thereto, the invention provides, as a second aspect thereof, an image display device that includes: a television connection terminal to which a television receiver can be connected; a video signal outputting section that outputs, to the television connection terminal, an analog video signal for displaying an image on the television receiver; a resistor element that is connected to the television connection terminal, the resistor element having the same resistance value as that of a termination resistor of a connection terminal of the television receiver that can be connected to the television connection terminal; a reference voltage generation circuit that generates reference voltages for comparing a voltage signal level at the television-connection-terminal-side end of the resistor element and a voltage signal level at the opposite-side end of the resistor element, the reference voltage generation circuit generating each of the reference voltages in such a manner that a first reference voltage for the television-connection-terminal-side end of the resistor element is higher than a second reference voltage for the opposite-side end of the resistor element by a predetermined level difference; a first clamping circuit that clamps, at the first reference voltage, a voltage signal level that is generated at the television-connection-terminal-side end of the resistor element by the analog video signal; a second clamping circuit that clamps, at the second reference voltage, a voltage signal level that is generated at the opposite-side end of the resistor element by the analog video signal; a comparison circuit that has a first input terminal into which a voltage signal that has been subjected to clamping processing performed by the first clamping circuit is inputted and further has a second input terminal into which a voltage signal that has been subjected to clamping processing performed by the second clamping circuit is inputted, the comparison circuit outputting a voltage signal that has a level corresponding to high/low relationship between a voltage signal level at the first input terminal and a voltage signal level at the second input terminal that is found as a result of a comparison made therebetween; a first low-pass filter that is provided between the first input terminal of the comparison circuit and the first clamping circuit; a second low-pass filter that is provided between the second input terminal of the comparison circuit and the second clamping circuit; a judging section that makes a judgment as to whether an analog video signal input device is connected to the television connection terminal or not on the basis of a voltage signal level outputted from the comparison circuit; an image displaying section that displays an image; and a controlling section that commands an image to be displayed on the image displaying section if it is judged by the judging section that no analog video signal input device is connected to the television connection terminal.

With the configuration of a television-connection-state detecting device according to the second aspect of the invention described above, on the basis of an analog video signal that is outputted to the television connection terminal, it is possible to make a judgment as to whether the television receiver is connected to the television connection terminal or not with high detection accuracy. When no television receiver is connected to the television connection terminal, an image is displayed on the image displaying section provided in television-connection-state detecting device according to the second aspect of the invention described above. Therefore, it is possible to display an image either on the television receiver or on the image displaying section with a reliable switchover.

In the configuration of a television-connection-state detecting device according to the second aspect of the invention described above, it is preferable that the controlling section commands that the display of an image on the image displaying section should be ceased if it is judged by the judging section that an analog video signal input device is connected to the television connection terminal. With such a preferred configuration, since the controlling section commands that the display of an image on the image displaying section should be ceased if it is judged by the judging section that an analog video signal input device is connected to the television connection terminal, it is possible to reduce power consumption. It should be noted that, even when the display of an image on the image displaying section is ceased in accordance with the instruction given from the controlling section, a user does not suffer any inconvenience because a larger image is displayed on a television receiver on the basis of an analog video signal that is outputted to the television connection terminal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
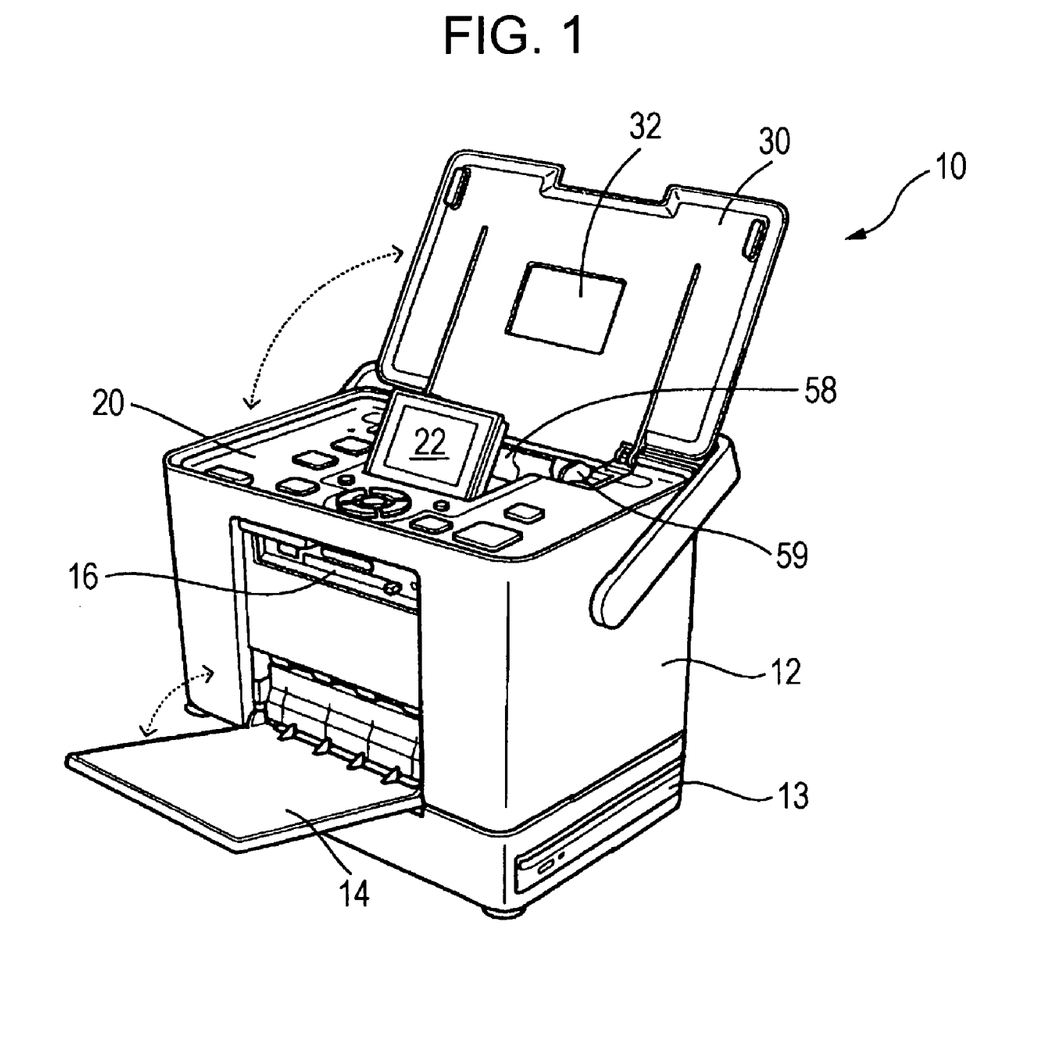
FIG. 1 is a perspective view that schematically illustrates an example of the general appearance of a photo-printer, which is a non-limiting example of an image display device according to an exemplary embodiment of the invention.
Figure 2:
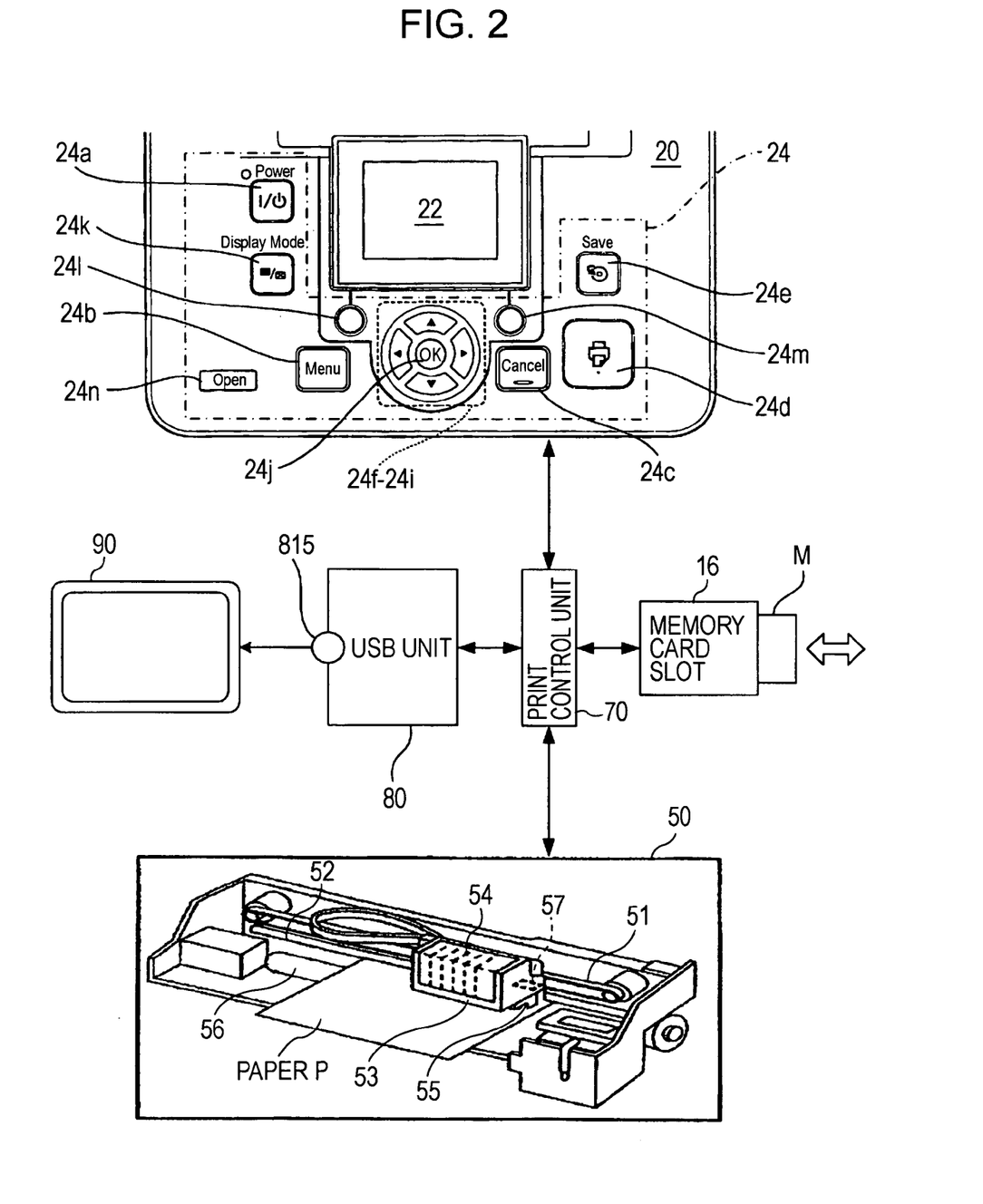
FIG. 2 is a diagram that schematically illustrates an example of the inner configuration of the photo-printer illustrated in FIG. 1.
Figure 3:
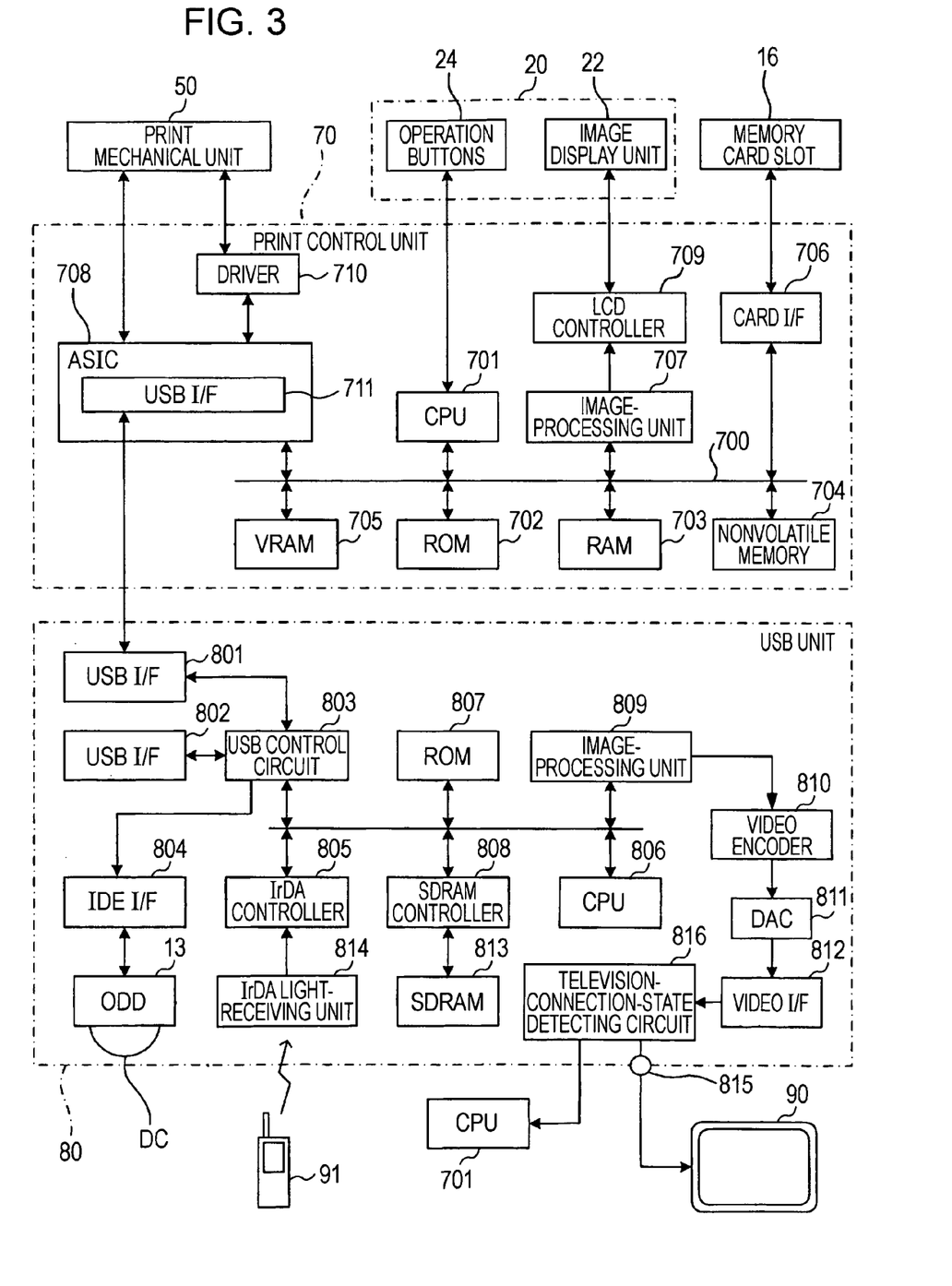
FIG. 3 is a block diagram that illustrates an example of the electric configuration of the photo-printer illustrated in FIG. 1.

FIG. 1 is a perspective view that schematically illustrates an example of the general appearance of a photo-printer, which is a non-limiting example of an image display device according to an exemplary embodiment of the invention. FIG. 2 is a diagram that schematically illustrates an example of the inner configuration of the photo-printer illustrated in FIG. 1. FIG. 3 is a block diagram that illustrates an example of the electric configuration of the photo-printer illustrated in FIG. 1. A print mechanical unit 50 is built inside the printer body 12 of a photo-printer 10. In response to an operation command issued from a recording control unit (hereafter referred to as "print control unit") 70, which is responsible for controlling the operations of the print mechanical unit 50, the print mechanical unit 50 performs printing on a sheet of print target paper P. After the completion of a printing job, the printed paper P is ejected onto an paper-eject tray, which is described below, in front of the printer body 12 of the photo-printer 10.

As illustrated in FIG. 1, a front flap 14 is provided on the printer body 12 of the photo-printer 10. The front flap 14 hinges on the printer body 12. The front flap 14 is a cover that opens/closes the front of the printer body 12. When the front flap 14 is in an open position, it functions as the aforementioned paper-eject tray that receives a sheet of the print-completed paper P that is ejected out of the print mechanical unit 50. In addition, when the front flap 14 is open, a user can physically access to (i.e., use) a memory card slot 16 that is provided at the inner front face of the printer body 12 of the photo-printer 10. That is, when the front flap 14 is open, they can insert various kinds of memory cards M in which a print-target image file(s) is stored into the memory card slot 16. In addition to the memory cards M, other types of storage media such as audio compact discs (CD) and video digital versatile discs (DVD), though not limited thereto, are available for use on the photo-printer 10 according to the present embodiment of the invention. Specifically, the photo-printer 10 is provided with an optical disc drive 13 at the base portion (refer to FIG. 1) of the printer body 12 thereof.

A user operation panel 20 is provided on the inner top face of the printer body 12. A cover 30 is provided over the inner top face of the printer body 12 in such a manner that the cover 30 hinges on the distal edge of the inner top face of the printer body 12. The cover 30, which is made of a resin, has the shape of a molded plate that is large enough to cover the inner top face of the printer body 12. When the cover 30 is in an open position, the manipulation surface of the user operation panel 20 is exposed to the outside (refer to FIG. 1). When the cover 30 is in a closed position, it covers the surface of the user operation panel 20 as a whole.

The user operation panel 20 has an image display unit 22 and a variety of operation buttons 24. The image display unit 22 displays, for example, characters, figures, symbols, and the like. The image display unit 22 is configured as a liquid crystal display (LCD), though not limited thereto. The operation buttons 24 are arranged around the image display unit 22. As illustrated in FIG. 2, the operation buttons 24 are made up of, though not necessarily limited thereto, a power button 24a, a menu button 24b, a cancel button 24c, a print button 24d, a save button 24e, a group of arrow buttons 24f, 24g, 24h, and 24i, an OK button 24j, a display switchover button 24k, a left guide selection button 24l, a right guide selection button 24m, and a paper-eject tray open button 24n. The power button 24a is pressed down so as to turn the power of the photo-printer 10 ON or OFF. The menu button 24b is pressed down so as to call up a main menu window (i.e., main menu screen). The cancel button 24c is pressed down so as to cancel some user operation or abort printing on a sheet of print target paper P. The print button 24d is pressed down so as to instruct the execution of printing on a sheet of print target paper P. The save button 24e is pressed down so as to save, for example, an edited image, though not limited thereto, into a memory card M that is inserted in the memory card slot 16. Each of the left arrow button (e.g., 24f), the right arrow button (e.g., 24g), the up arrow button (e.g., 24h), and the down arrow button (e.g., 24i) is pressed down so as to select a desired choice among a plurality of available choices displayed on the image display unit 22 or move a cursor displayed thereon, which are a few non-limiting examples of the use of these arrow buttons. The OK button 24j is provided at the center of these arrow buttons 24f, 24g, 24i, and 24j. The OK button 24j is pressed down so as to enter the desired choice that is selected by a user by manipulating the arrow buttons 24f, 24g, 24i, and 24j. The display switchover button 24k is pressed down so as to switch over windows or other kind of displayed images on the image display unit 22. The left guide selection button 24l is pressed down so as to select a left guide that is displayed on the image display unit 22. The right guide selection button 24m is pressed down so as to select a right guide that is displayed on the image display unit 22. Finally, the paper-eject tray open button 24n is pressed down so as to open the front flap 14, which functions as a paper-eject tray when opened as has already been explained above.

The cover 30 has a viewing window 32 that has substantially the same size as that of the image display unit 22. The viewing window 32 allows a user to view content displayed in the image display unit 22 without opening the cover 30. That is, when the cover 30 is in a closed position, a user can view content displayed in the image display unit 22 through the viewing window 32. On the other hand, when the cover 30 is in an open position, a user can tilt the image display unit 22 at a desired angle as illustrated in FIG. 1.

When the cover 30 is in an open state, the posture thereof is held in such a manner that it is tilted backward with respect to, that is, as viewed from, the user operation panel 20 (or, in other words, as viewed from a user). In such a slanted position, the cover 30 functions as a paper-feed tray, which is used for feeding a sheet of print target paper P to the print mechanical unit 50. A paper-feed port 58 of the print mechanical unit 50 is provided behind the user operation panel 20. A pair of paper-guiding members 59 that can be moved in a horizontal direction in a sliding manner so as to adjust the paper-guiding width thereof into the width of a sheet of print target paper S is provided.

A sheet of print target paper P is fed through the paper-feed port 58 into the print mechanical unit 50. Then, the print mechanical unit 50 performs printing on the sheet of print target paper P fed thereto. As illustrated in FIG. 2, the print mechanical unit 50 has, among its constituent elements, a timing belt 51, a guide axis 52, and a carriage 53. The timing belt 51 is stretched with an adequate tension in the form of a horizontal loop. The carriage 53 is fixed to the timing belt 51. As the timing belt 51 is driven, the carriage reciprocates in a horizontal direction, that is, moves to the left/right, along the guide axis 52. The carriage 53 is provided with a paper edge detection sensor 57. The paper edge detection sensor 57 detects the left edge and right edge of a sheet of print target paper P and the top edge and bottom edge thereof. Specifically, for example, the paper edge detection sensor 57 detects the left edge of a sheet of print target paper P and the right edge thereof when the carriage 53 travels in a main-scan (i.e., horizontal) direction with respect to the print target paper P that is set at the paper-feed port 58 prior to the execution of printing thereon. As a result of the detection of the left edge and right edge thereof, it is possible to recognize the width of the print target paper P. In addition, the paper edge detection sensor 57 detects the rear edge of the print target paper P during the execution of printing thereon. As a result of the detection of the rear edge thereof, it is possible to recognize the length of the print target paper P.

A plurality of ink cartridges 54 is detachably attached to the carriage 53. Each of these ink cartridges 54 detachably mounted on the carriage 53 contains ink of the corresponding color such as, in a typical color combination thereof, cyan (C), magenta (M), yellow (Y), or black (K). These C, M, Y, and K ink cartridges 54 are in communication with a print head 55. The print head 55 applies pressure to ink that is supplied thereto from the C, M, Y, and K ink cartridges 54 so as to discharge ink drops from the nozzles thereof toward the print target paper P. Note that the nozzles of the print head 55 are not illustrated in the drawing. In the configuration of the photo-printer 10 according to the present embodiment of the invention, it is assumed that the print head 55 applies a voltage to each piezoelectric element so as to deflect the piezoelectric element for pressurizing ink. However, needless to say, the scope of the invention is not limited to such a configuration. As a non-limiting exemplary configuration of the print head 55 that can be adopted as a substitute for such a popular piezoelectric pressure-generating scheme, a thermal pressure-generating scheme may be adopted in which a voltage is applied to an exothermic body such as a heater so as to heat ink. In such a modified configuration, ink is pressurized by air bubbles that are generated as a result of the heating thereof. After the completion of printing performed as described above, a paper transport roller 56 transports the paper P to the opened front flap 14, that is, the aforementioned paper-eject tray.

As illustrated in FIG. 3, a CPU 701, a ROM 702, a RAM 703, a nonvolatile memory 704, a VRAM 705, a card interface (I/F) 706, an image-processing unit 707, and an ASIC 708 are connected to the system bus 700 of the print control unit 70. It should be particularly noted that, in order to facilitate the understanding of the invention, the same single CPU 701 is shown at two places in FIG. 3. The CPU 701 performs arithmetic processing so as to control the operations of the print mechanical unit 50. In addition thereto, on the basis of a signal supplied from a television-connection-state detecting circuit 816 that will be described later, the CPU 701 makes a judgment as to whether a television (TV) set 90 is connected to an RCA video terminal 815 or not. Then, the CPU 701 communicates the result of the television-connection-state judgment to another CPU 806, which is provided in a USB unit 80. Moreover, the CPU 701 performs control as to whether the image display unit 22 should display an image or not on the basis of the same result of the television-connection-state judgment. A more detailed explanation of the above-described functional operation of the CPU 701 will be given later.

The ROM 702 stores programs, that is, firmware, that are necessary for the CPU 701 to perform various kinds of control. The RAM 703 stores data temporarily. The nonvolatile memory 704 stores various kinds of data and tables that are necessary for the CPU 701 to perform various kinds of control. The VRAM 705 stores image data that is to be displayed in the image display unit 22. The card I/F 706 performs communication with the memory card slot 16 so as to read out image data that is stored in an external storage medium such as the aforementioned memory card M or the like, which is inserted in the memory card slot 16. In addition, the card I/F 706 writes image data into the aforementioned memory card M or the like in order to save an edited image or the like.

The image-processing unit 707 performs predetermined required image processing on the image data that is read by the card I/F 706 out of the external storage medium such as the aforementioned memory card M or the like. In addition, the image-processing unit 707 generates display data that corresponds to a specific image that is unique to the printer 10. An example of such printer-specific unique image, which is to be displayed on the image display unit 22, is a menu window (i.e., menu screen), though not limited thereto. Then, the image-processing unit 707 sends combined data, which is obtained as a result of combination of the generated display data and the image-processed image data, to an LCD controller 709. The LCD controller 709 controls the display of the image display unit 22.

The ASIC 708 has a built-in control circuit that controls the operation of a paper transport motor that is provided in the print mechanical unit 50 so as to provide a driving force for transporting a sheet of print target paper P and further controls the operation of a carriage motor that provides a driving force for rotating the timing belt 51. The ASIC 708 has another built-in control circuit that controls the driving of the print head 55. Note that reference numerals are not assigned to the paper transport motor and the carriage motor. The ASIC 708 sends a motor control signal and a print head control signal, which are generated on the basis of a control signal supplied from the CPU 701, to a driving circuit (i.e., driver) 710. Through the ASIC 708, data acquired by the sensor 57, which is explained as a paper edge detection sensor in the foregoing description but not necessarily limited thereto, enters the CPU 701. The ASIC 708 has a universal serial bus (USB) interface 711. With such an interfacing configuration, the ASIC 708 of the print control unit 70 is capable of conducting data communication with the USB unit 80 in compliance with the USB standard.

As illustrated in FIG. 3, the USB unit 80 is provided with a pair of USB interfaces 801 and 802, a USB control circuit 803, an integrated drive electronics (IDE) interface 804, an IrDA controller 805, the CPU 806, a ROM 807, an SDRAM controller 808, an image-processing unit 809, a video encoder 810, a D/A converter 811, and a video interface 812. Among these functional components of the USB unit 80, the USB control circuit 803, the IrDA controller 805, the CPU 806, the ROM 807, the SDRAM controller 808, and the image-processing unit 809 are connected to a system bus 800. With such an electric connection, the USB control circuit 803, the IrDA controller 805, the CPU 806, the ROM 807, the SDRAM controller 808, and the image-processing unit 809 are capable of transmitting/receiving data to/from one another. In the configuration of the photo-printer 1 according to the present embodiment of the invention, all of these functional blocks 801-812 of the USB unit 80 are mounted on the same single chip and thus configured as system-on-a-chip (SOC) components.

In addition to the above-described functional components, the USB unit 80 is provided with an SDRAM 813, an IrDA light-receiving unit 814, and an ODD 13. Moreover, the USB unit 80 is further provided with the aforementioned RCA video terminal 815 to which the television set 90 is connected and the aforementioned television-connection-state detecting circuit 816.

A USB interface 801 of the USB unit 80 performs the transmission/reception of data to/from the aforementioned USB interface 711 of the ASIC 708 of the print control unit 70. Another USB interface 802 of the USB unit 80 performs the transmission/reception of data to/from an external device such as a digital still camera, a personal computer, or the like. The USB control circuit 803 is provided with a macro that constitutes a USB physical layer. The USB interfaces 801 and 802 together with the USB control circuit 803 establish USB physical connection and enable data transmission. The ODD 13 is connected to the IDE interface 804. The IDE interface 804 functions as an ATA/ATAPI interface circuit. The USB control circuit 803 is provided with a USB-IDE conversion unit, which functions as a USB-ATA/ATAPI conversion circuit. The USB-IDE conversion unit of the USB control circuit 803 is responsible for the conversion of an input/output signal of each of the USB interfaces 801 and 802 and an input/output signal of the IDE interface 804 in an interactive manner.

The IrDA controller 805 has a function to receive an input of a digital image file from a mobile phone 91 via the IrDA light-receiving unit 814 by means of infrared communication. The IrDA controller 805 has another function to offer an infrared remote control manipulation capability. Note that an infrared remote controller is not shown in the drawing. The CPU 806 controls the operation of each component block of the USB unit 80 by executing the program (i.e., firmware) that is stored in the ROM 807. The CPU 806 has another function of converting an input/output signal of the IrDA controller 805 into an input/output signal of each of the USB interfaces 801 and 802.

The SDRAM 813 is connected to the SDRAM controller 808. The SDRAM controller 808 allows the CPU 806 to use the SDRAM 813 as a work memory. In addition, when an analog video signal is outputted to the TV receiver (i.e., television set) 90 that is connected to the RCA video terminal 815, the SDRAM controller 808 allows the SDRAM 813 to be used as a frame memory.

The image-processing unit 809 performs predetermined image processing that is required for displaying an image on the TV receiver 90 on image data that is sent from the print control unit 70 via the USB interface 801 and/or image data that is sent from an external device such as a digital still camera via the USB interface 802, though not necessarily limited thereto. In addition, the image-processing unit 809 generates display data that corresponds to a specific image that is unique to the printer 10. An example of such printer-specific unique image, which is to be displayed on the TV receiver 90, is a menu window (i.e., menu screen), though not limited thereto. Then, the image-processing unit 809 sends combined data, which is obtained as a result of combination of the generated display data and the image-processed image data, to the video encoder 810.

In the configuration of the photo-printer 10 according to the present embodiment of the invention, it is assumed that the video encoder 810 converts the video format of the combined data sent from the image-processing unit 809 into an NTSC TV format. Notwithstanding the foregoing, the video encoder 810 may convert the video format of the combined data sent from the image-processing unit 809 into other TV format conforming to, for example, PAL or SECAM. As another modification example thereof, the video encoder 810 may be configured so that it can convert the video format of the combined data sent from the image-processing unit 809 into any one of a plurality of video formats that allows a user to make selection among them.

Then, the signal format of the image data is converted from digital to analog at the D/A converter 811. Next, the analog image data is inputted into the video interface 812. Thereafter, it passes through an electrical resistor R1 (refer to FIG. 4) of the television-connection-state detecting circuit 816 to be outputted at the RCA video terminal 815. A more detailed explanation of the electrical resistor R1 is given below. By this means, an image is displayed on the display screen of the TV receiver 90.

Figure 4:
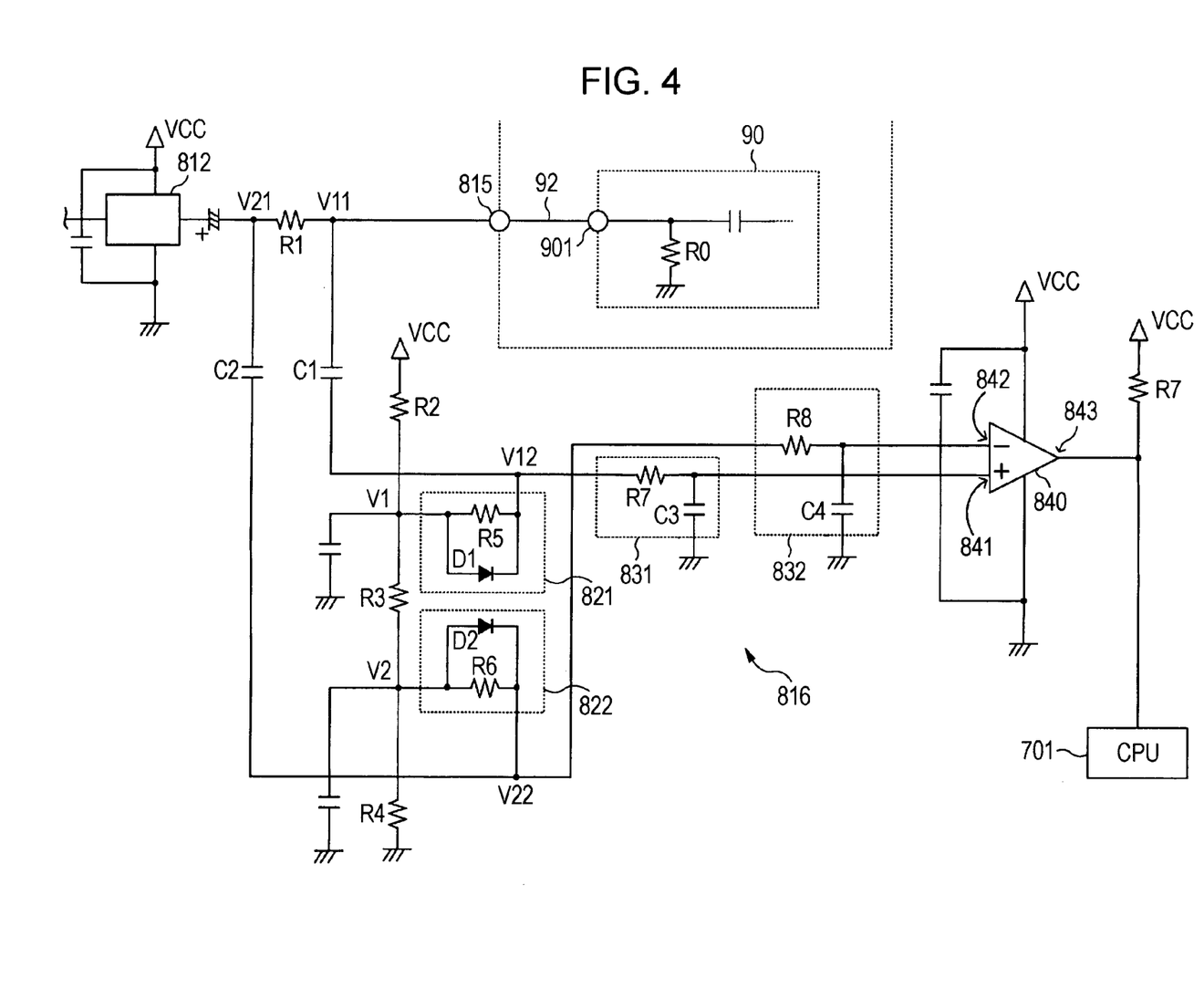
FIG. 4 is a circuit diagram that illustrates an example of the electric configuration of a television-connection-state detecting circuit according to an exemplary embodiment of the invention.
Figure 5A:
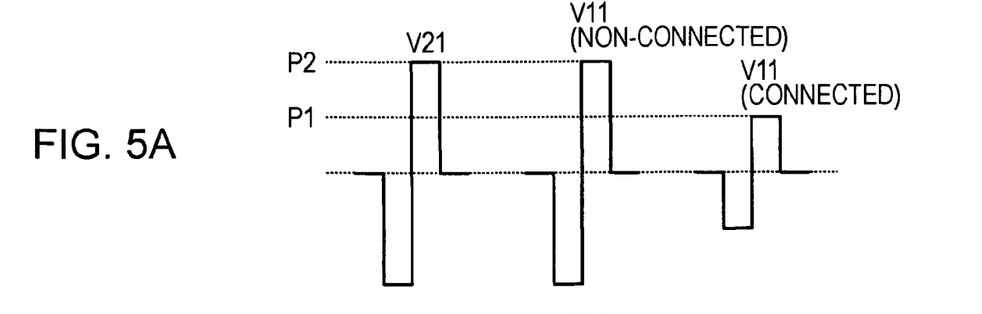
FIGS. 5A, 5B, and 5C is a set of diagrams that illustrates an example of voltage signals taken at some points of the television-connection-state detecting circuit illustrated in FIG. 4.
Figure 5B:
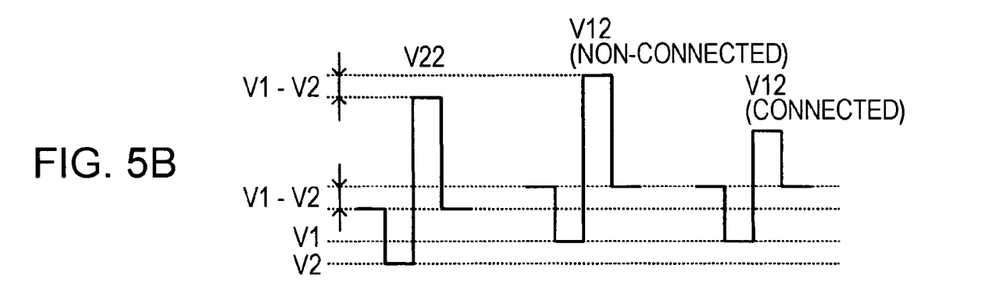
Figure 5C:
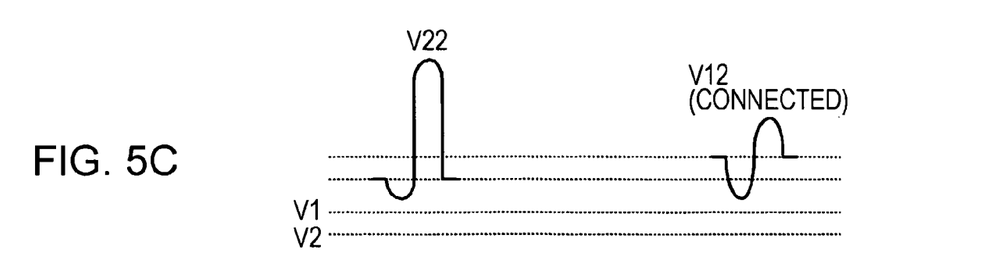

FIG. 4 is a circuit diagram that illustrates an example of the electric configuration of a television-connection-state detecting circuit according to an exemplary embodiment of the invention. FIGS. 5A, 5B, and 5C is a set of diagrams that illustrates an example of voltage signals taken (e.g., measured) at some points of the television-connection-state detecting circuit illustrated in FIG. 4. As illustrated in FIG. 4, the RCA video terminal 815 and a connection terminal 901 of the TV receiver 90 are connected to each other via a connection cable 92. In a typical configuration of the TV receiver 90, the connection terminal 901 of the TV receiver 90 is terminated by means of a termination resistor R0 that has a predetermined resistance value such as 75Ω.

In the circuit configuration of the television-connection-state detecting circuit 816 according to the present embodiment of the invention, the aforementioned electrical resistor R1 is provided between the video interface 812 and the RCA video terminal 815. The electrical resistor R1 has the same resistance value as that of the termination resistor R0 of the TV receiver 90. The electrical resistor R1 according to the present embodiment of the invention corresponds to a "resistor element" according to an aspect of the invention. The television-connection-state detecting circuit 816 makes detection as to whether the TV receiver 90 is connected to the RCA video terminal 815 or not on the basis of a voltage signal V11 taken (i.e., measured) at the RCA-video-terminal-side (815) end of the electrical resistor R1 and another voltage signal V21 taken at the opposite-side end of the electrical resistor R1. As illustrated in FIG. 5A, in a state where nothing is connected to the RCA video terminal 815, and in particular, in a state where the TV receiver 90 is not connected to the RCA video terminal 815, the waveform of the voltage signal V11 is the same as that of the voltage signal V21. On the other hand, upon the connection of the TV receiver 90 to the RCA video terminal 815, the amplitude P1 of the voltage signal V11 decreases to one-half of the amplitude P2 of the voltage signal V21 because the electrical resistor R1 has the same resistance value as that of the termination resistor R0 of the TV receiver 90.

In the circuit configuration of the television-connection-state detecting circuit 816 according to the present embodiment of the invention, a power supply circuit VCC and resistor dividers (i.e., resistors) R2, R3, and R4 generate reference voltages V1 and V2. These resistor dividers R2, R3, and R4 are connected in series. The reference voltage V1 according to the present embodiment of the invention corresponds to a "first reference voltage" according to an aspect of the invention. The reference voltage V2 according to the present embodiment of the invention corresponds to a "second reference voltage" according to an aspect of the invention. The resistor divider R3 is provided for the purpose of generating a level difference between the reference voltage V1 and the reference voltage V2. The resistor divider R3 has a resistance value that is smaller than those of the resistor dividers R2 and R4. Specifically, for example, assuming that the voltage of the power supply circuit VCC is 3.3 V and that the resistance value of each of the resistor dividers. R2 and R4 is 160Ω, and further assuming that the resistance value of the resistor divider R3 is 10Ω, it follows that a difference in the level between the reference voltage V1 and the reference voltage V2 is 0.1 V. In the circuit configuration of the television-connection-state detecting circuit 816 according to the present embodiment of the invention, the power supply circuit VCC and the resistor dividers R2, R3, and R4, which are connected in series, make up a "reference voltage generation circuit" according to an aspect of the invention.

A capacitor C1 and a parallel circuit 821, which is made up of an electrical resistor R5 and a diode D1 that are connected in parallel, are provided between the aforementioned RCA-video-terminal-side (815) end of the electrical resistor R1 and the connection point that is formed between the resistor divider R2 and the resistor divider R3. In other words, the capacitor C1 and the parallel circuit 821 are provided between the generation point of the voltage signal V11, which corresponds to the aforementioned RCA-video-terminal-side (815) end of the electrical resistor R1, and the generation point of the reference voltage V1, which corresponds to the connection point that is formed between the resistor divider R2 and the resistor divider R3. The capacitor C1 and the parallel circuit 821 are connected in series. The parallel circuit 821 according to the present embodiment of the invention corresponds to a "first clamping circuit" (i.e., clamp circuit) according to an aspect of the invention. The connection point between the capacitor C1 and the parallel circuit 821 is connected to a non-inverting input terminal 841 of a comparator 840 via a low-pass filter (hereafter may be abbreviated as "LPF") 831. The LPF 831 is made up of an electrical resistor R7 and a capacitor C3. The LPF 831 according to the present embodiment of the invention corresponds to a "first low-pass filter" according to an aspect of the invention. The non-inverting input terminal 841 of the comparator 840 according to the present embodiment of the invention corresponds to a "first input terminal" according to an aspect of the invention.

Similarly, a capacitor C2 and a parallel circuit 822, which is made up of an electrical resistor R6 and a diode D2 that are connected in parallel, are provided between the aforementioned opposite-side end of the electrical resistor R1 and the connection point that is formed between the resistor divider R3 and the resistor divider R4. In other words, the capacitor C2 and the parallel circuit 822 are provided between the generation point of the voltage signal V21, which corresponds to the aforementioned opposite-side end of the electrical resistor R1, and the generation point of the reference voltage V2, which corresponds to the connection point that is formed between the resistor divider R3 and the resistor divider R4. The capacitor C2 and the parallel circuit 822 are connected in series. The parallel circuit 822 according to the present embodiment of the invention corresponds to a "second clamping circuit" according to an aspect of the invention. The connection point between the capacitor C2 and the parallel circuit 822 is connected to an inverting input terminal 842 of the comparator 840 via a low-pass filter (hereafter may be abbreviated as "LPF") 832. The LPF 832 is made up of an electrical resistor R8 and a capacitor C4. The LPF 832 according to the present embodiment of the invention corresponds to a "second low-pass filter" according to an aspect of the invention. The inverting input terminal 842 of the comparator 840 according to the present embodiment of the invention corresponds to a "second input terminal" according to an aspect of the invention. An output terminal 843 of the comparator 840 is pulled up by means of a pull-up resistor R7. In addition thereto, the output terminal 843 of the comparator 840 is connected to the input port of the aforementioned CPU 701 of the print control unit 70. The comparator 840 according to the present embodiment of the invention corresponds to a "comparison circuit" (i.e., comparator circuit) according to an aspect of the invention.

As illustrated in FIG. 5B, a voltage signal V12 taken at the connection point between the capacitor C1 and the parallel circuit 821 is clamped at the reference voltage V1 because of the functioning of the parallel circuit 821. This connection-point voltage signal V12 according to the present embodiment of the invention corresponds to a "first clamped signal" (i.e., first clamp signal) according to an aspect of the invention. On the other hand, a voltage signal V22 taken at the connection point between the capacitor C2 and the parallel circuit 822 is clamped at the reference voltage V2 because of the functioning of the parallel circuit 822. This connection-point voltage signal V22 according to the present embodiment of the invention corresponds to a "second clamped signal" according to an aspect of the invention. Since the voltage signals V12 and V22 are clamped at the reference voltages V1 and V2, respectively, it is possible to compare the levels thereof with each other. In comparison with that of the voltage signal V22, the level of the voltage signal V12 is higher by a level difference between the reference voltage V1 and the reference voltage V2, that is, by (V1−V2).

As has already been described above, in a state where nothing is connected to the RCA video terminal 815, and in particular, in a state where the TV receiver 90 is not connected to the RCA video terminal 815, the waveform of the voltage signal V11 is the same as that of the voltage signal V21. In such a non-connection state, the level of the voltage signal V12 that is inputted into the comparator 840 is higher than that of the voltage signal V22 by the level difference between the reference voltage V1 and the reference voltage V2. For this reason, a high-level voltage signal is outputted from the output terminal 843 of the comparator 840. Then, on the basis of the HIGH voltage signal outputted from the output terminal 843 of the comparator 840, the CPU 701 of the print control unit 70 judges that the TV receiver 90 is not connected to the RCA video terminal 815. The CPU 701 of the print control unit 70 communicates this "non-connected" judgment result to the CPU 806 of the USB unit 80 via the aforementioned USB interfaces 711 and 801. In addition thereto, the CPU 701 commands a necessary image to be displayed on the image display unit 22.

On the other hand, as has already been described above, upon the connection of the TV receiver 90 to the RCA video terminal 815, the amplitude P1 of the voltage signal V11 decreases to one-half of the amplitude P2 of the voltage signal V21 because the electrical resistor R1 has the same resistance value as that of the termination resistor R0 of the TV receiver 90. Therefore, in such a connection state, the level of the voltage signal V12 that is inputted into the comparator 840 is lower than that of the voltage signal V22. For this reason, a low-level voltage signal is outputted from the output terminal 843 of the comparator 840. Then, on the basis of the LOW voltage signal outputted from the output terminal 843 of the comparator 840, the CPU 701 of the print control unit 70 judges that the TV receiver 90 is connected to the RCA video terminal 815. The CPU 701 of the print control unit 70 communicates this "connected" judgment result to the CPU 806 of the USB unit 80 via the aforementioned USB interfaces 711 and 801. In addition thereto, the CPU 701 commands that the display of an image on the image display unit 22 should be ceased.

Then, upon the disconnection of the TV receiver 90 from the RCA video terminal 815 during the display of an image on the display screen of the TV receiver 90, a high-level voltage signal is outputted from the output terminal 843 of the comparator 840. Accordingly, on the basis of the HIGH voltage signal outputted from the output terminal 843 of the comparator 840, the CPU 701 of the print control unit 70 judges that the TV receiver 90 is not connected to the RCA video terminal 815. The CPU 701 of the print control unit 70 communicates this "non-connected" judgment result to the CPU 806 of the USB unit 80 via the USB interfaces 711 and 801. In addition thereto, the CPU 701 commands that the display of an image on the image display unit 22 should be resumed. In the configuration of the photo-printer 10 according to the present embodiment of the invention, the CPU 701 according to the present embodiment of the invention corresponds to a "judging section" according to an aspect of the invention. In addition thereto, the CPU 701 according to the present embodiment of the invention further corresponds to a "controlling section" according to an aspect of the invention. Moreover, in the configuration of the photo-printer 10 according to the present embodiment of the invention, the CPU 701 and the television-connection-state detecting circuit 816 make up a "television-connection-state detecting device" according to an aspect of the invention.

Next, the reason why the low-pass filter 831 and the low-pass filter 832 are connected to the non-inverting input terminal 841 of the comparator 840 and the inverting input terminal 842 thereof, respectively, is explained.

As understood from FIG. 5B, since the reference voltage V1 is higher than the reference voltage V2 by a predetermined level difference, even in a state where the TV receiver 90 is connected to the RCA video terminal 815, the level of the voltage signal V12 is higher than that of the voltage signal V22 during a time period in which each of the voltage signals V12 and V22 is at its minimum level, or in other words, during a time period in which the voltage signals V12 and V22 fall to the reference voltages V1 and V2, respectively. This means that, if no measures are taken, the high/low level of a voltage signal outputted from the output terminal 843 of the comparator 840 switches over frequently, which is not desirable.

In addition, in an NTSC color television system that is an example of a variety of television formats, an analog video signal that is outputted to the RCA video terminal 815 is configured as a superposed signal made up of a luminance signal and a high-frequency (e.g., 3.58 MHz) color-difference signal superposed thereon. Therefore, upon the disconnection of the connection cable 92 from the connection terminal 901 of the TV receiver 90, the phase of the voltage signal V12 and the phase of the voltage signal V22 could be shifted from each other if the disconnected connection cable 92 is one that has a large capacity, which is an undesirable phenomenon. If the phase of the voltage signal V12 and the phase of the voltage signal V22 are shifted from each other so as to reverse the level relationship between the voltage signal V12 and the voltage signal V22, erroneous detection of the presence of the TV receiver 90 connected to the RCA video terminal 815, which is actually not, occurs.

In order to address such a technical problem, in the circuit configuration of the television-connection-state detecting circuit 816 according to the present embodiment of the invention, the low-pass filter 831 and the low-pass filter 832 are connected to the non-inverting input terminal 841 of the comparator 840 and the inverting input terminal 842 thereof, respectively. Because of such a filtering configuration, the high-frequency component of each of the voltage signals V12 and V22 that is inputted into the comparator 840 is cut out. Therefore, in a state where the TV receiver 90 is connected to the RCA video terminal 815, the resultant voltage signals V12 and V22 are free from the above-described problem that is related to the level difference between the reference voltage V1 and the reference voltage V2. Moreover, since the low-pass filter 831 and the low-pass filter 832 cut out the high-frequency components of the voltage signals V12 and V22 that are inputted into the comparator 840, respectively, the resultant voltage signals V12 and V22 are free from the above-described problem that is related to the phase shift of the voltage signals V12 and V22 with respect to each other. Therefore, it is possible to avoid the level relationship between the voltage signal V12 and the voltage signal V22 from becoming reversed undesirably. Thus, with the configuration of a combination of the CPU 701 and the television-connection-state detecting circuit 816 according to the present embodiment of the invention, which is provided with the low-pass filter 831 and the low-pass filter 832 as explained above and makes up a "television-connection-state detecting device" according to an aspect of the invention, it is possible to make a judgment as to whether the television set 90 is connected to the RCA video terminal 815 or not with high detection accuracy.

As explained above, in the configuration of the photo-printer 10, or more specifically, a combination of the CPU 701 and the television-connection-state detecting circuit 816 according to the present embodiment of the invention, the electrical resistor R1, which has the same resistance value as that of the termination resistor R0 of the TV receiver 90, is electrically connected to the RCA video terminal 815. The television-connection-state detecting circuit 816 makes detection as to whether the TV receiver 90 is (physically and thus electrically) connected to the RCA video terminal 815 or not on the basis of the voltage signal V11 taken at the RCA-video-terminal-side (815) end of the electrical resistor R1 and the voltage signal V21 taken at the opposite-side end of the electrical resistor R1. In the circuit configuration of the television-connection-state detecting circuit 816 according to the present embodiment of the invention, the power supply circuit VCC and the resistor dividers R2, R3, and R4, which are connected in series, generate the reference voltages V1 and V2. The capacitor C1 and the parallel circuit 821, which is made up of the electrical resistor R5 and the diode D1 that are connected in parallel, are provided between the RCA-video-terminal-side (815) end of the electrical resistor R1 and the connection point that is formed between the resistor divider R2 and the resistor divider R3. The capacitor C1 and the parallel circuit 821 are connected in series. The connection point between the capacitor C1 and the parallel circuit 821 is connected to the non-inverting input terminal 841 of the comparator 840 via the low-pass filter 831, which is made up of the electrical resistor R7 and the capacitor C3. On the other hand, the capacitor C2 and the parallel circuit 822, which is made up of the electrical resistor R6 and the diode D2 that are connected in parallel, are provided between the opposite-side end of the electrical resistor R1 and the connection point that is formed between the resistor divider R3 and the resistor divider R4. The capacitor C2 and the parallel circuit 822 are connected in series. The connection point between the capacitor C2 and the parallel circuit 822 is connected to the inverting input terminal 842 of the comparator 840 via the low-pass filter 832, which is made up of the electrical resistor R8 and the capacitor C4. The output terminal 843 of the comparator 840 is pulled up by means of the pull-up resistor R7. In addition thereto, the output terminal 843 of the comparator 840 is connected to the input port of the CPU 701 of the print control unit 70. Having such a configuration, the photo-printer 10, or more specifically, a combination of the CPU 701 and the television-connection-state detecting circuit 816 according to the present embodiment of the invention, makes it possible to detect whether the TV receiver 90 is connected to the RCA video terminal 815 or not with improved precision.

Although various exemplary embodiments of the present invention are described above, needless to say, the invention is in no case restricted to these exemplary embodiments described herein; the invention may be configured in an adaptable manner in a variety of variations and/or modifications without departing from the spirit thereof. In the configuration of the television-connection-state detecting circuit 816 according to the foregoing exemplary embodiment of the invention, it is assumed that the low-pass filter 831 is made up of the electrical resistor R7 and the capacitor C3 whereas the low-pass filter 832 is made up of the electrical resistor R8 and the capacitor C4. However, the configuration of each of the low-pass filters 831 and 832 is not limited to such an example. As a non-limiting modification example thereof, each of the low-pass filters 831 and 832 may be configured by means of other circuit elements such as a coil and the like. As another non-limiting modification example thereof, if the parasitic capacitance of the non-inverting input terminal 841 of the comparator 840 is a sufficient value, the low-pass filter 831 may be configured by means of the electrical resistor R7 only, which means that the capacitor C3 is not provided therein. Similarly, if the parasitic capacitance of the inverting input terminal 842 of the comparator 840 is a sufficient value, the low-pass filter 832 may be configured by means of the electrical resistor R8 only, which means that the capacitor C4 is not provided therein.

In the configuration of the photo-printer 10, or more specifically, a combination of the CPU 701 and the television-connection-state detecting circuit 816 according to the foregoing exemplary embodiment of the invention, it is explained that the TV receiver 90 is directly connected to the RCA video terminal 815. However, it is not limited to such an exemplary configuration. For example, the TV receiver 90 may be indirectly connected to the RCA video terminal 815 via a video cartridge recorder or a DVD recorder, though not limited thereto.

The invention is applicable not only to the photo-printer 10 according to the foregoing exemplary embodiment of the invention but also to a variety of other electronic devices that is provided with a built-in image display unit so as to be capable of displaying an image thereon and is further capable of outputting an analog video signal to an external television receiver so as to display an image thereon. A few non-limiting examples thereof are a digital still camera and a personal digital assistant (PDA). A target image to be displayed is not limited to a still picture. Thus, the invention is applicable to a type of electronic devices that displays moving pictures such as a movie camera, though not limited thereto.

What is claimed is:

1. A television-connection-state detecting device comprising:
- a resistor element that is connected to a television connection terminal that outputs an analog video signal that is to be displayed on a television receiver, the resistor element having the same resistance value as that of a termination resistor of a connection terminal of the television receiver that can be connected to the television connection terminal;
- a reference voltage generation circuit that generates reference voltages for comparing a voltage signal level at the television-connection-terminal-side end of the resistor element and a voltage signal level at the opposite-side end of the resistor element, the reference voltage generation circuit generating each of the reference voltages in such a manner that a first reference voltage for the television-connection-terminal-side end of the resistor element is higher than a second reference voltage for the opposite-side end of the resistor element by a predetermined level difference;
- a first clamping circuit that clamps a voltage signal level at the television-connection-terminal-side end of the resistor element at the first reference voltage;
- a second clamping circuit that clamps a voltage signal level at the opposite-side end of the resistor element at the second reference voltage;
- a comparison circuit that has a first input terminal into which a voltage signal that has been subjected to clamping processing performed by the first clamping circuit is inputted and further has a second input terminal into which a voltage signal that has been subjected to clamping processing performed by the second clamping circuit is inputted, the comparison circuit outputting a voltage signal that has a level corresponding to high/low relationship between a voltage signal level at the first input terminal and a voltage signal level at the second input terminal that is found as a result of a comparison made therebetween;
- a first low-pass filter that is provided between the first input terminal of the comparison circuit and the first clamping circuit;
- a second low-pass filter that is provided between the second input terminal of the comparison circuit and the second clamping circuit; and
- a judging section that makes a judgment as to whether an analog video signal input device is connected to the television connection terminal or not on the basis of a voltage signal level outputted from the comparison circuit.

2. An image display device comprising:
- a television connection terminal to which a television receiver can be connected;
- a video signal outputting section that outputs, to the television connection terminal, an analog video signal for displaying an image on the television receiver;
- a resistor element that is connected to the television connection terminal, the resistor element having the same resistance value as that of a termination resistor of a connection terminal of the television receiver that can be connected to the television connection terminal;
- a reference voltage generation circuit that generates reference voltages for comparing a voltage signal level at the television-connection-terminal-side end of the resistor element and a voltage signal level at the opposite-side end of the resistor element, the reference voltage generation circuit generating each of the reference voltages in such a manner that a first reference voltage for the television-connection-terminal-side end of the resistor element is higher than a second reference voltage for the opposite-side end of the resistor element by a predetermined level difference;
- a first clamping circuit that clamps, at the first reference voltage, a voltage signal level that is generated at the television-connection-terminal-side end of the resistor element by the analog video signal;
- a second clamping circuit that clamps, at the second reference voltage, a voltage signal level that is generated at the opposite-side end of the resistor element by the analog video signal;
- a comparison circuit that has a first input terminal into which a voltage signal that has been subjected to clamping processing performed by the first clamping circuit is inputted and further has a second input terminal into which a voltage signal that has been subjected to clamping processing performed by the second clamping circuit is inputted, the comparison circuit outputting a voltage signal that has a level corresponding to high/low relationship between a voltage signal level at the first input terminal and a voltage signal level at the second input terminal that is found as a result of a comparison made therebetween;
- a first low-pass filter that is provided between the first input terminal of the comparison circuit and the first clamping circuit;
- a second low-pass filter that is provided between the second input terminal of the comparison circuit and the second clamping circuit;
- a judging section that makes a judgment as to whether an analog video signal input device is connected to the television connection terminal or not on the basis of a voltage signal level outputted from the comparison circuit;
- an image displaying section that displays an image; and
- a controlling section that commands an image to be displayed on the image displaying section if it is judged by the judging section that no analog video signal input device is connected to the television connection terminal.

3. The image display device according to claim 2, wherein the controlling section commands that the display of an image on the image displaying section should be ceased if it is judged by the judging section that an analog video signal input device is connected to the television connection terminal.

* * * * *